United States Patent
Reulet et al.

(10) Patent No.: US 10,430,160 B2
(45) Date of Patent: *Oct. 1, 2019

(54) METHOD AND SYSTEM FOR GENERATING A RANDOM BIT SAMPLE

(71) Applicant: Quantum Numbers Corp., Brossard (CA)

(72) Inventors: Bertrand Reulet, Sherbrooke (CA); Jean-Charles Phaneuf, Montreal (CA)

(73) Assignee: Quantum Numbers Corp., Broussard (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,010

(22) Filed: Oct. 2, 2018

(65) Prior Publication Data

US 2019/0220251 A1   Jul. 18, 2019

Related U.S. Application Data

(63) Continuation of application No. 15/917,121, filed on Mar. 9, 2018, now Pat. No. 10,168,996.

(Continued)

(51) Int. Cl.
  *G06F 7/58* (2006.01)
  *H03K 3/84* (2006.01)

(52) U.S. Cl.
  CPC .............. *G06F 7/588* (2013.01); *H03K 3/84* (2013.01)

(58) Field of Classification Search
  CPC .............................................. G06F 7/58–7/588

(Continued)

(56) References Cited

U.S. PATENT DOCUMENTS 6,324,558 B1  11/2001  Wilber
6,571,263 B1   5/2003  Nagai
(Continued)

FOREIGN PATENT DOCUMENTS

CN      1645626 A   7/2005
CN    101006422 A   7/2007
(Continued)

OTHER PUBLICATIONS

F. Xu, B. Qi, X. Ma, H. Xu, H. Zheng, and H.-K. Lo, "Ultrafast quantum random number generation based on quantum phase fluctuations", Opt. Express 12366, vol. 20, No. 11, 2012 (Year: 2012).*

(Continued)

*Primary Examiner* — Matthew D Sandifer
(74) *Attorney, Agent, or Firm* — Norton Rose Fulbright US LLP

(57) ABSTRACT

The method for generating a random bit sample involves a quantum tunneling barrier. The method generally has: generating a current of charges tunneling across said quantum tunneling barrier, the current of the tunneled charges having an instantaneous level varying randomly due to quantum tunneling fluctuations and forming a raw signal; from said raw signal, obtaining a raw bit sample having a first bit number n, the first bit number n being an integer; extracting the randomness out of the raw bit sample into the random bit sample, the random bit sample having a second bit number m being smaller than the first bit number n, said extracting being based on calibration data comprising at least a quantum contribution value of said quantum tunneling fluctuations in said raw bit sample; and on an external contribution value in said raw bit sample.

36 Claims, 12 Drawing Sheets

Related U.S. Application Data

(60) Provisional application No. 62/617,444, filed on Jan. 15, 2018.

(58) Field of Classification Search
USPC .................................................. 708/250–256
See application file for complete search history.

(56) References Cited

U.S. PATENT DOCUMENTS

| | | | |
|---|---|---|---|
| 6,919,579 | B2 | 7/2005 | Amin et al. |
| 6,965,907 | B2 | 11/2005 | Klass |
| 7,405,423 | B2 | 7/2008 | Tanamoto et al. |
| 7,573,094 | B2 | 8/2009 | Ohba et al. |
| 7,930,333 | B2 | 4/2011 | Vartsky et al. |
| 8,033,091 | B2 | 10/2011 | Michalewicz et al. |
| 8,039,890 | B2 | 10/2011 | Matsumoto et al. |
| 8,307,022 | B2 | 11/2012 | Matsumoto et al. |
| 8,351,603 | B2 | 1/2013 | Oishi et al. |
| 8,495,118 | B2 | 7/2013 | Wang et al. |
| 8,521,795 | B2 | 8/2013 | Fukushima et al. |
| 8,544,324 | B2 | 10/2013 | Michalewicz et al. |
| 8,874,631 | B2 | 10/2014 | Matsumoto et al. |
| 9,110,746 | B2 | 8/2015 | Zhu et al. |
| 9,164,729 | B2 | 10/2015 | Wu et al. |
| 9,529,570 | B2 | 12/2016 | Anderson et al. |
| 2001/0020701 | A1 | 9/2001 | Zagoskin |
| 2003/0162587 | A1 | 8/2003 | Tanamoto et al. |
| 2005/0180219 | A1 | 8/2005 | Ohba et al. |
| 2007/0296025 | A1 | 12/2007 | Matsumoto et al. |
| 2008/0076525 | A1 | 3/2008 | Kim |
| 2008/0079442 | A1 | 4/2008 | Posamentier |
| 2010/0174766 | A1 | 7/2010 | Weeks et al. |
| 2010/0308328 | A1 | 12/2010 | Makihara et al. |
| 2013/0110895 | A1 | 5/2013 | Valentino et al. |
| 2014/0287816 | A1 | 9/2014 | Homer |
| 2015/0071432 | A1 | 3/2015 | Zhu et al. |
| 2015/0199178 | A1* | 7/2015 | Shi .................... G06F 7/588 708/254 |
| 2016/0062735 | A1 | 3/2016 | Wilber |
| 2016/0139884 | A1 | 5/2016 | Valentino et al. |
| 2017/0010865 | A1* | 1/2017 | Sanguinetti .......... H04L 9/0852 |
| 2017/0262259 | A1* | 9/2017 | Reulet .................. G06N 99/002 |
| 2018/0067723 | A1* | 3/2018 | Chan .................... G06F 7/588 |

FOREIGN PATENT DOCUMENTS

| | | | |
|---|---|---|---|
| CN | 103930866 A | | 7/2014 |
| CN | 104216678 A | | 12/2014 |
| CN | 104516712 A | | 4/2015 |
| CN | 106537484 A | | 3/2017 |
| DE | 102013004795 A1 | | 9/2013 |
| EP | 3040853 A1 * | | 7/2016 ............. H04L 9/0866 |
| JP | 2003108364 A | | 4/2003 |
| JP | 4160605 B2 | | 10/2008 |
| JP | 4359130 B2 | | 11/2009 |
| JP | 4365872 B2 | | 11/2009 |
| JP | 4538066 B2 | | 9/2010 |
| KR | 20110132993 A | | 12/2011 |
| KR | 101564954 B1 | | 11/2015 |
| KR | 20150124405 A | | 11/2015 |
| KR | 101617832 B1 | | 5/2016 |
| KR | 20160061316 A | | 5/2016 |
| WO | WO-2005101194 A1 | | 10/2005 |
| WO | WO-2005106645 A2 | | 11/2005 |
| WO | WO-2009064167 A2 | | 5/2009 |
| WO | WO-2015168798 A1 * | | 11/2015 ............. G06F 7/588 |
| WO | WO-2016135611 A1 | | 9/2016 |

OTHER PUBLICATIONS

X. Ma, F. Xu, H. Xu, X. Tan, B. Qi, and H.-K. Lo, "Postprocessing for Quantum Random-No. Generators: Entropy Evaluation and Randomness Extraction", Phys. Rev. A 87, 062327, 2013 (Year: 2013).*

Barangi et al. "Straintronics-Based True Random Number Generator for High-Speed and Energy-Limited Applications", IEEE Transactions on Magnetics, vol. 52. No. 1, Jan. 2016.

European Search Report dated Sep. 27, 2018, from European application No. 18161523.8, 5 pages.

Fong et al. "Spin-Transfer Torque Devices for Logic and Memory: Prospects and Perspectives", IEEE Transactions on Computer-Aided Design of Integrated Circuits and Systems. vol. 35. No. 1. Jan. 2016.

Hochul Lee et al. "Design of High-throughput and Low-power True Random Number Generator Utilizing Perpendicularly Magnetized Voltage-controlled Magnetic Tunnel Juncion," AIP Advances 7, 055934, 2017 [available online at http://aip.scitation.org/doi/pdf/10.1063/1.4978320].

Ma et al. "Postprocessing for Quantum Random-number Generators: Entropy Evaluation and Randomness Extraction," Phys. Rev. A, vol. 87, 2013.

Mansour et al. "The Computational Complexity of Universal Hashing," Theoretical Computer Science, vol. 107, 1993.

Mauerer et al. "A Modular Framework for Randomness Extraction Based on Trevisan's Construction," Arxiv preprint arXiv:1212.0520, 2012.

Michael A. Wayne, "Optical Quantum Random Number Generation: Applications of Single-Photon Event Timing," 2017, [available on at http://research.physics.illinois.edu/QI/Photonics/theses/wayne-thesis-phd.pdf].

Office Action dated Aug. 21, 2018 from Chinese Appl. 201580036883.4, 11 pages.

Robeyst, et al "Monitoring the setting of concrete containing blast-furnace slag by measuring the ultrasonic p-wave velocity," Cement and Concrete Research 38 (2008) 1169-1176.

Spietz, et al "Primary Electronics Thermometry Using the Shot Noise of a Tunnel Junction," Science, vol. 300, 2003.

Stipcevic, "Quantum Random Number Generators and Their Use in Cryptography," 2011 [available online at http://research.physics.illinois.edu/QI/Photonics/theses/ware-thesis-phd.pdf].

Stipcevic, et al. "True Random Number Generators," 2006, [available online at http://cs.ucsb.edu/~koc/cren/docs/w06/trng.pdf].

Thibault, "Pauli-Heisenberg Blockade of Electron Quantum Transport," arXiv preprint arXiv:1410.0931. 2014.

Wilber, "Entropy Analysis and System Design for Quantum Random Number Generators in CMOS Integrated Circuits," 2013 [available online at https://comscire.com/files/whitepaper/Pure_Quantum_White_Paper.html].

Written Opinion of the International Preliminary Examining Authority, PCT/EP2017/066658, dated Oct. 16, 2018, 8 pp.

Xu et al. "Ultrafast Quantum Random Number Generation Based on Quantum Phase Fluctuations," Opt. Express 12366, vol. 20, No. 11, 2012.

* cited by examiner

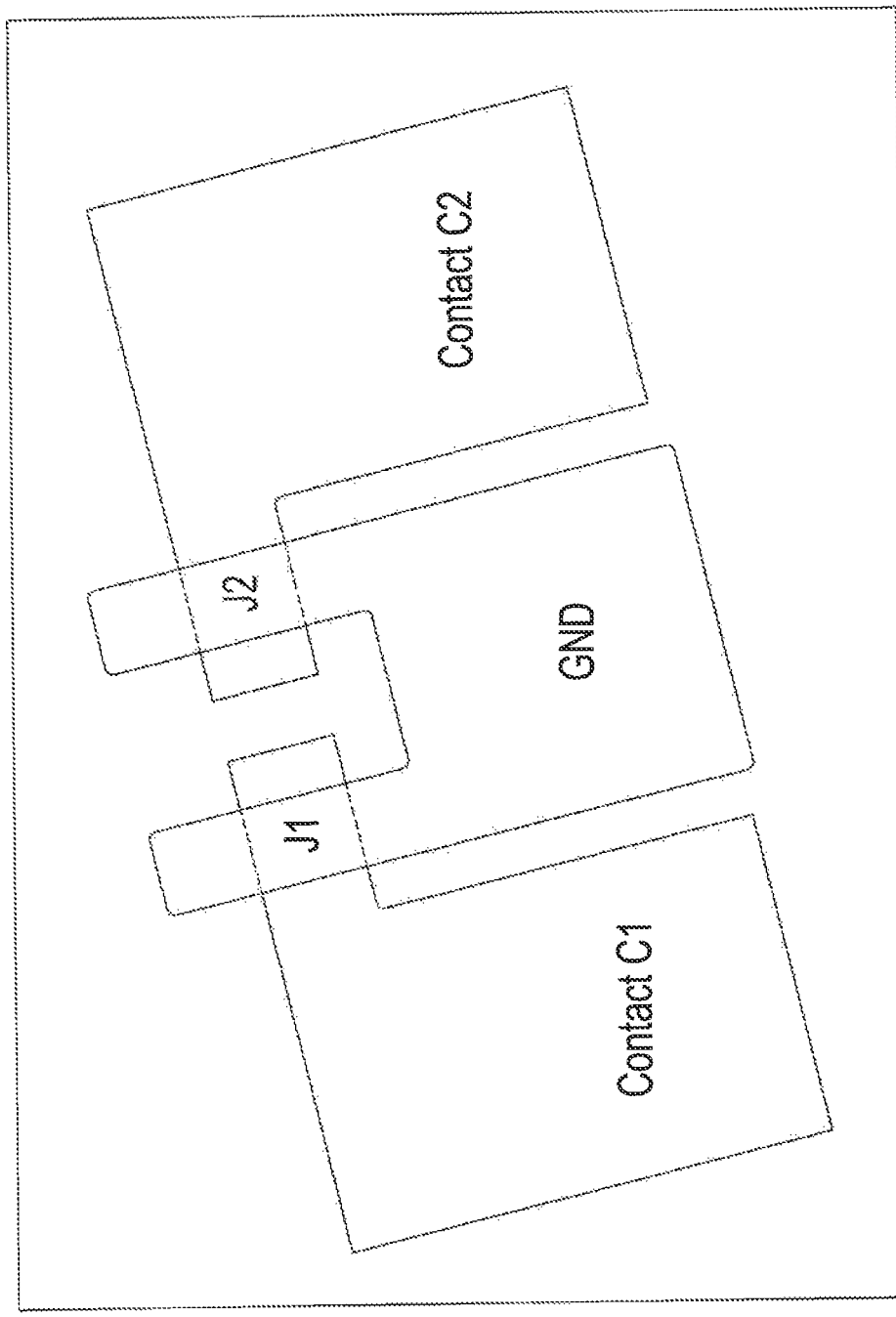

METHOD AND SYSTEM FOR GENERATING A RANDOM BIT SAMPLE

CROSS-REFERENCE TO RELATED APPLICATIONS

The present application is a continuation of U.S. patent application Ser. No. 15/917,121 filed Mar. 9, 2018, entitled "METHOD AND SYSTEM FOR GENERATING A RANDOM BIT SAMPLE" and claims the benefit of U.S. Provisional Patent Application No. 62/617,444, filed on Jan. 15, 2018, the contents of which are incorporated herein by reference in their entirety.

TECHNICAL FIELD

The present disclosure generally relates to the field of random bit generation using quantum tunnelling of charges.

BACKGROUND

Random bits have found valuable applications in many fields such as cryptography, games of chance, scientific calculus and/or statistical studies. In these applications, the randomness of the generated random bits is of great importance since their predictability can lead to unsecure communication, to cheating and/or unreliable scientific results, for instance.

The expression "random" is used in a relatively liberal manner in the field of random bit generators because the bit streams which are produced are typically known to have a certain level of deterministicity (i.e., to be not purely random). Several approaches have been developed in a manner to assess the quality of the randomness in random bit samples, such as the statistical test suite for random bit generators developed by the National Institute of Standards and Technology (NIST).

Characteristics which are sought from random bit generators include the quality of randomness, the ability to produce random bits at a relatively high rate, pricing, footprint, etc. There thus remains room for improvement in providing a suitable device for producing random bit generation.

SUMMARY

Quantum noise sources present features which are inherently random, and thus may be harnessed for random bit generation having a high level of randomness quality. For instance, bit samples can be generated on the basis of a current of charges (negatively-charged electrons and/or positively-charged holes) randomly tunnelling across a quantum tunnelling barrier. The quantum tunnelling barrier can be in the form of an electrical insulator sandwiched between conductors, for instance. The current of tunneled charges has an instantaneous level varying randomly due to inherent random nature of quantum tunneling and thus forms a low-level electrical noise. As can be understood, the low-level electrical noise is typically filtered, amplified and digitized into raw bit samples from which bit samples of satisfactory randomness may then be determined.

It may be required to process the signal stemming from a quantum tunnelling barrier, such as via amplification for instance, in order to be able to provide a raw signal usable for random bit generation. The processing can be partially or fully deterministic in nature, and can generate external noise which becomes intrinsically entangled with the quantum noise of the raw signal, and which reduces the quality of the randomness of the resulting raw bit samples. Accordingly, even when a truly quantum process such as quantum tunnelling is used as the source of raw bit sample generation, the quality of the randomness may be less than perfect, and may be hindered during processing.

There is described herein a method which can alleviate at least some of the inconveniences associated with the processing of the raw signal stemming from a quantum tunnelling barrier. This can be done by extracting bit samples of higher randomness quality out of such raw bit samples using calibration data comprising a quantum contribution value of the quantum tunneling barrier and an external contribution value due at least to the amplifiers.

In one aspect, there is provided a method for generating a random bit sample using a quantum tunneling barrier comprising an insulator sandwiched between two conductors, the method comprising: generating a current of charges tunneling from a first one of the two conductors to a second one of the two conductors and across the insulator, the current of the tunneled charges having an instantaneous level varying randomly due to quantum tunneling fluctuations and forming a raw signal; from said raw signal, obtaining a raw bit sample having a first bit number n, the first bit number n being an integer; extracting the randomness out of the raw bit sample into the random bit sample, the random bit sample having a second bit number m being smaller than the first bit number n, said extracting being based on calibration data comprising at least a quantum contribution value of said quantum tunneling fluctuations in said raw bit sample; and an external contribution value in said raw bit sample.

In one aspect there is provided a system for generating a random bit sample, the system comprising: a quantum tunneling barrier circuit having a quantum tunneling barrier incorporating an insulator sandwiched between two conductors, a current of charges tunneling from a first one of the two conductors to a second one of the two conductors and across the insulator, the current of the tunneled charges having an instantaneous level varying randomly due to quantum tunneling fluctuations and forming a raw signal; a monitoror configured to received said raw signal and to, from said raw signal, obtain a raw bit sample having a first bit number n, the first bit number n being an integer; and a randomness extractor configured to extract the randomness out of the raw bit sample into the random bit sample, the random bit sample having a second bit number m being smaller than the first bit number n, said extracting being based on calibration data comprising at least a quantum contribution value of said quantum tunneling fluctuations in said raw bit sample; and an external contribution value in said raw bit sample.

The method can be embodied by relatively simple electronic components and thus be made readily available on a common board. Moreover, the gauging and the choice of electronic components can also allow producing such random bit samples at a satisfactory rate, using surprisingly simple electronic components. Moreover, there is provided a random bit generator which comprises a board or a Printed Circuit Board (PCB) having one or more quantum tunnelling barriers mounted thereon, and adapted to be connected to a biasing source (source of charges) which can be either incorporated directly on the board or provided separately. Since quantum tunnelling can involve a large quantity of tunneled charges which can tunnel across the quantum tunnelling barrier at a high rate, such a random bit generator can, in theory, allow very rapid generation and acquisition of random bit samples.

It will be understood that the expression "computer" as used herein is not to be interpreted in a limiting manner. It is rather used in a broad sense to generally refer to the combination of some form of one or more processing units and some form of memory system accessible by the processing unit(s). Similarly, the expression "controller" as used herein is not to be interpreted in a limiting manner but rather in a general sense of a device, or of a system having more than one device, performing the function(s) of controlling one or more device such as an electronic device or an actuator for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DESCRIPTION OF DRAWINGS

For a more complete understanding of the present invention, reference is now made to the following descriptions taken in conjunction with the accompanying figures, in which:

FIG. 10C is an oblique view of quantum tunneling barriers of the raw bit generator of FIG. 10A.

DETAILED DESCRIPTION

Figure 1:
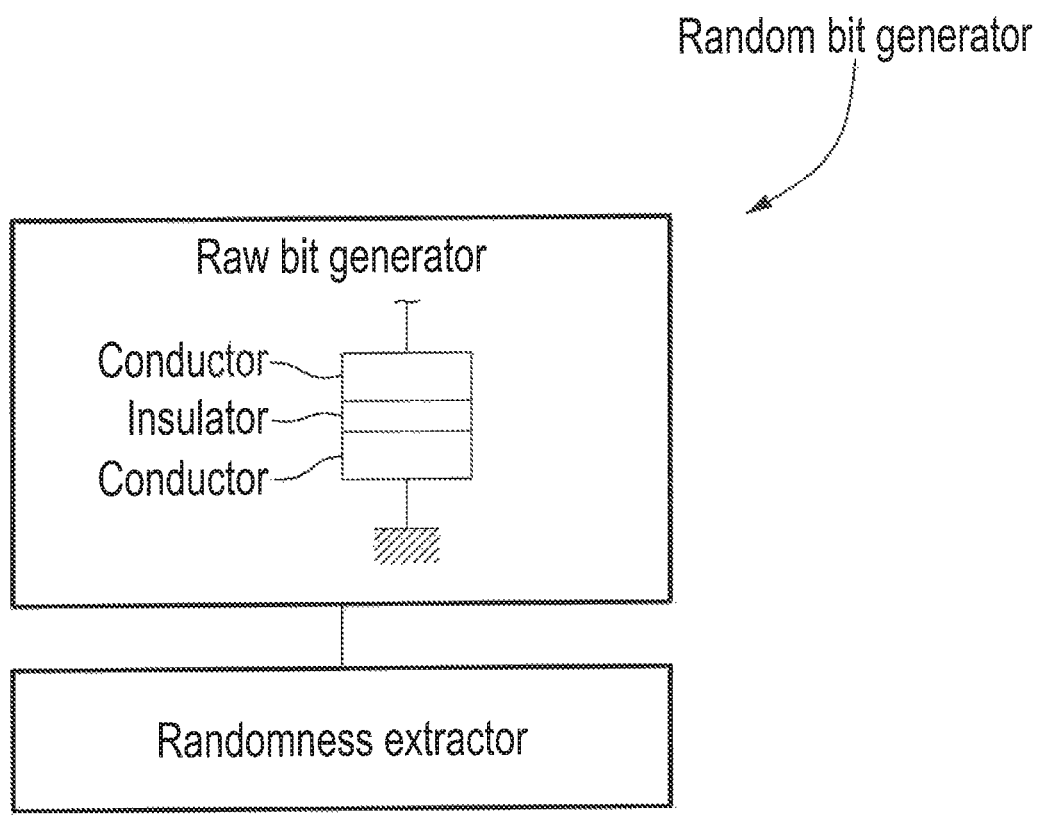
FIG. 1 is a schematic view of an example of a random bit generator comprising a raw bit generator and a randomness extractor, in accordance with an embodiment.

FIG. 1 shows an example of random bit generator. As depicted, the random bit generator has a raw bit generator incorporating a quantum tunneling barrier, and a randomness extractor. As will be described in detail below with reference to FIG. 9, the raw bit generator has a quantum tunneling barrier circuit which incorporates a quantum tunneling barrier having an insulator sandwiched between two conductors.

Figure 2:
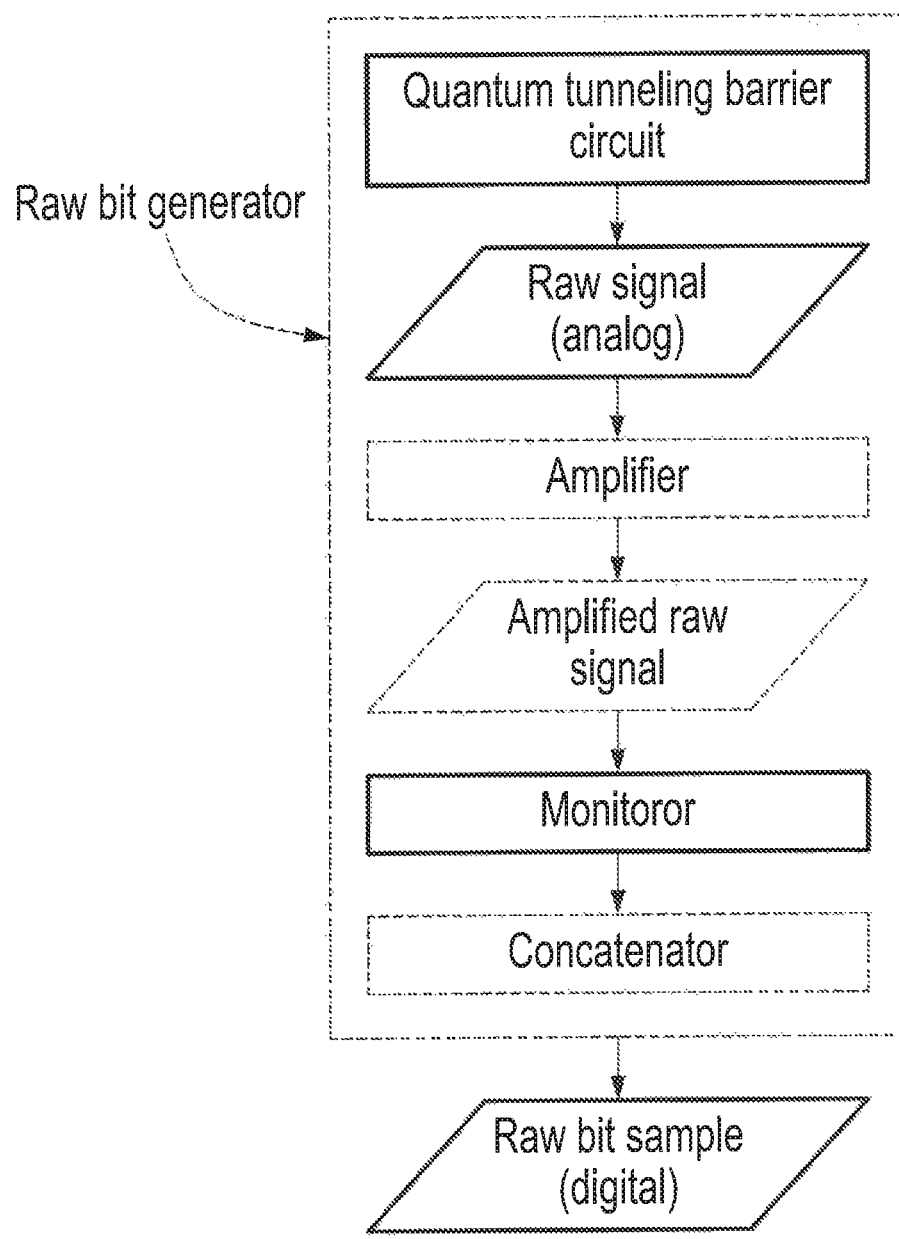
FIG. 2 is a schematic view of an example of the raw bit generator of FIG. 1.

Turning now to FIG. 2, the quantum tunneling barrier circuit is configured to provide a raw signal resulting from a current of charges tunneling from a first one of the two conductors to a second one of the two conductors and across the insulator. As the raw signal is an analog signal, the current of the tunneled charges has an instantaneous level varying randomly due to quantum tunneling fluctuations.

As shown, the raw bit generator has a monitoror, which is configured to receive, directly or indirectly, the raw signal from the quantum tunneling barrier. For instance, the raw signal may be received directly from the quantum tunneling barrier. However, in some other embodiments, such as in the illustrated embodiment, the raw signal provided by the quantum tunneling barrier circuit is conveniently amplified using at least one amplifier to provide an amplified raw signal of a satisfactory level. In this case, the raw signal is received indirectly from the quantum tunneling barrier via the at least one amplifier.

The monitoror is also configured to provide one or more digital, raw bit samples from the raw signal. In the illustrated embodiment, the monitoror provides the raw bit samples from the amplified raw signal received from the amplifier. Each raw bit sample has a first bit number n, wherein the first bit number n is an integer. As will be described below, the monitoror can be provided in the form of a sampler. However, the sampler is optional as other monitoror alternatives can be used to convert the raw signal into the raw bit sample.

In some embodiments, the monitoror is provided in the form of a sampler which is configured to sample the instantaneous level of the raw signal, and attribute a value to the instantaneous level of the current of charges tunneling through the quantum tunneling barrier. In some embodiments, the raw bit sample can correspond to the value of the instantaneous level of the current. For instance, at a given moment in time, the sampler may sample the raw signal to have a value worth 5 out of a maximum value of $2^4-1=15$, and then provide the raw bit sample 0101, when the first bit number n is 4.

In some embodiments, the sampler can sample the instantaneous level of the raw signal at different moments in time to provide source bit samples each corresponding to the value of the instantaneous level of the current. However, in these embodiments, a concatenator can be used to concatenate the source bit samples to one another into the raw bit sample. For instance, at a first moment in time, the sampler may sample the raw signal to have a value of 1 out of $2^2-1=3$, and then provide a first source bit sample of 01. Then, at a second moment in time, the sampler may sample the raw signal to have a value of 2 out of $2^2-1=3$, and then provide a second source bit sample of 10. In this example, the concatenator can concatenate the first source bit sample and the second source bit sample to one another to provide the raw bit sample 0110 or 1001. In such embodiments, the first bit number n corresponds to a source bit number of each one of the source bit samples times the number of source bit samples concatenated to one another. As can be understood, the concatenator can be optional, as the monitoror can be configured to convert the raw signal directly into the raw bit sample. It is considered that concatenating source bit samples to one another may not be necessary in embodiments where successive source bit samples are not correlated to one another.

As can be understood, the raw signal provided by the quantum tunneling barrier circuit can be considered to be quantum, and thus non-deterministic. However, it is not be the case for the amplified raw signal or any form of processed raw signal. Indeed, in this embodiment, the amplification performed by the amplifier adds an external, non-quantum and deterministic contribution to the signal. Some external contribution may also be added by the monitoror (e.g., a sampler) or other electrical components of the raw bit generator. Therefore, the raw signal has both a quantum contribution and an external contribution, and so does the raw bit samples. As can be understood, by having an external contribution which is deterministic, random bits stemming directly from such a raw signal may be either deducible and/or controlled by a third party adversary, which may render such random bits less trustworthy for some applications such as cryptography applications.

Figure 3:
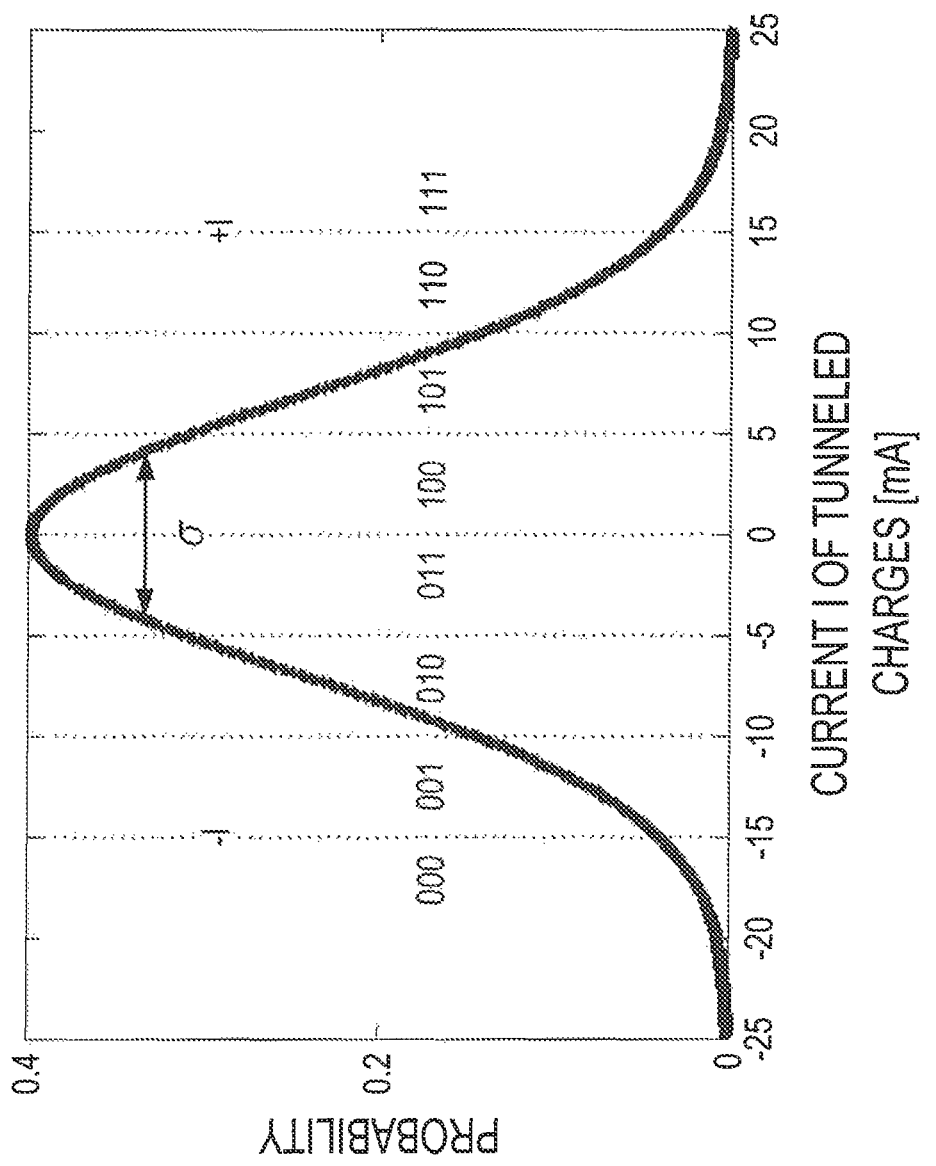
FIG. 3 is a graph showing probability of obtaining given raw bit samples from the raw bit generator of FIG. 2.

FIG. 3 shows an example of probability distribution of the raw bit samples obtained from the raw bit generator. In this specific example, the first bit number n corresponds to 3 for simplicity. For instance, when the instantaneous value of the raw signal ranges between 0 and 5 mA when sampled by the sampler, the raw bit sample generated is 100; when the instantaneous value of the raw signal ranges between 5 and 10 mA when sampled by the sampler, the raw bit sample generated is 101, and so forth. As shown, the probability of obtaining the raw bit sample 100 is greater than the probability of obtaining the raw bit sample 101, and so forth. The illustrated probability distribution is characterized by a standard deviation $\sigma$ and a variance $\sigma^2$.

The inventors submits that the variance $\sigma^2$ of the raw bit samples generated by the raw bit generator can be given by a relation equivalent to the following relation:

$$\sigma^2 = A(S_J + S_{ext}), \quad (1)$$

where A denotes an effective gain of the raw bit generator, $S_J$ denotes a quantum contribution value of the quantum tunneling fluctuations in the raw bit sample, and $S_{ext}$ denotes an external contribution value of at least the amplification in the raw bit sample. In this example, the effective gain A of the raw bit generator may include gains and impedances of amplifiers as well as the detection bandwidth. More specifically, the effective gain A can be given by the relation $A=R^2 G^2 \Delta f$, where R denotes a resistance of the quantum tunneling barrier, G denotes the effective gain of the amplifier, and $\Delta f$ denotes the bandwidth of the monitored raw signal. In some other embodiments, the effective gain G of the amplifier can be deduced from the specifications of the amplifier used. In alternate embodiments, the effective gain G of the amplifier can be determined by amplifying a given signal having a known amplitude, and by comparing the amplitude of the amplified signal to the known amplitude of the given signal. Otherwise, when the amplifier is absent, the effective gain G of the amplifier corresponds to the unity, and the effective gain A of the raw bit generator is given by $A=R^2 \Delta f$.

In the following example, the quantum contribution value $S_J$ is a spectral density of the raw signal obtained from the quantum tunneling barrier circuit whereas the external contribution value $S_{ext}$ is a spectral density of the external contribution due at least to the amplification provided by the amplifier.

However, it can be appreciated that the quantum contribution value can be provided in the form of a power value resulting from the integration of the spectral density of the raw signal over a given frequency bandwidth in some other embodiments. Similarly, in these embodiments, the external contribution value can be provided in the form of a power value resulting from the integration of the spectral density of the external contribution integrated over a given frequency bandwidth.

Figure 4:
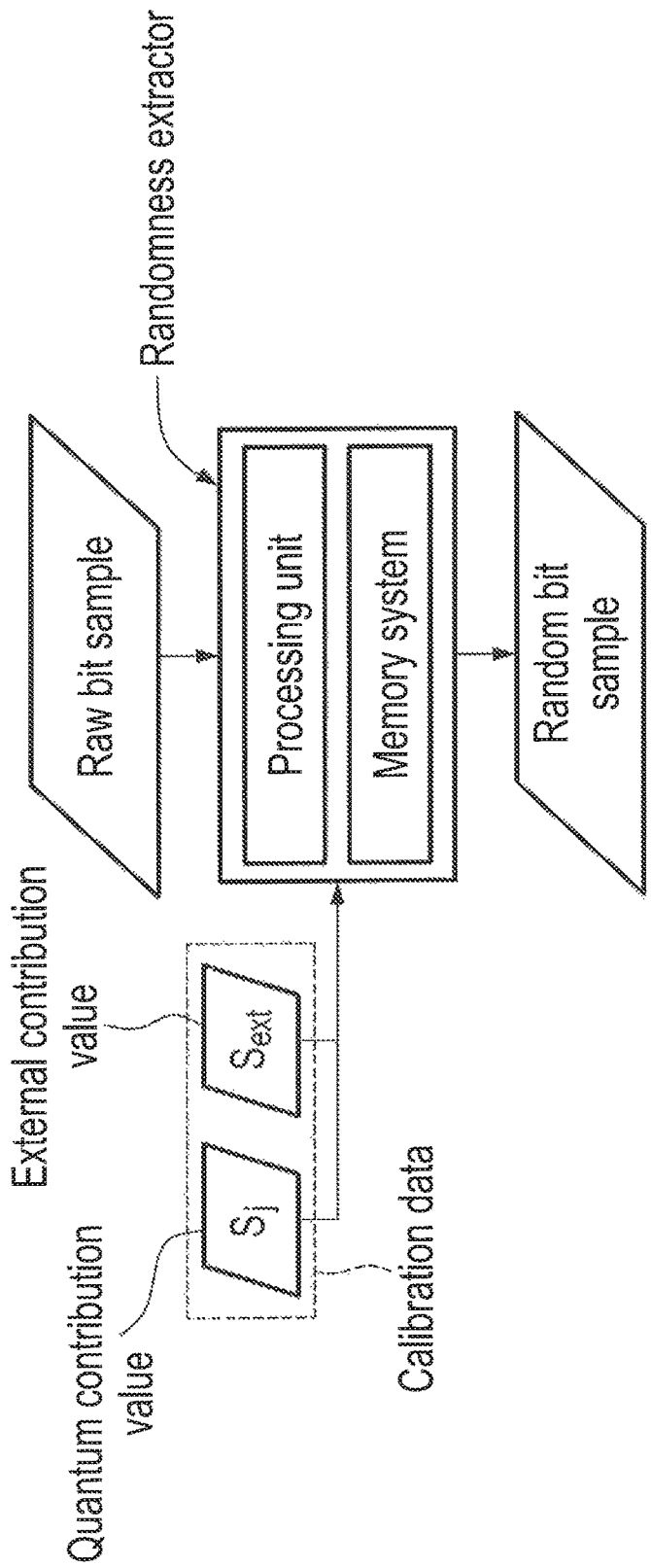
FIG. 4 is a schematic view of an example of the randomness extractor of FIG. 1.

Referring now to FIG. 4, the randomness extractor is configured to extract the randomness out of the raw bit sample(s) into random bit sample(s) having a second bit number m. As will be understood from the description below, the second bit number m is smaller than the first bit number n. Accordingly, bits are thus lost in the extraction process.

Such extraction of the randomness is based on calibration data comprising at least the quantum contribution value $S_J$ and the external contribution value $S_{ext}$.

In some embodiments, the calibration data, e.g., the quantum contribution value $S_J$ and the external contribution value $S_{ext}$, have been previously determined and are stored on the memory system of the randomness extractor. For instance, the calibration data may have been determined during manufacture of the random bit generator and then stored on the memory system. In this case, the random bit generator may yield satisfactory results when the random bit generator is used within certain limits, e.g., some predefined temperature limits.

In some other embodiments, the calibration data, e.g., the quantum contribution value $S_J$ and the external contribution value $S_{ext}$, can be determined on the go from variance data $\sigma^2(V)$ indicating how the variance $\sigma^2$ of the raw bit sample(s) obtained from the quantum tunneling barrier varies as function of the voltage V at which the quantum tunneling barrier is operated.

Figure 5:
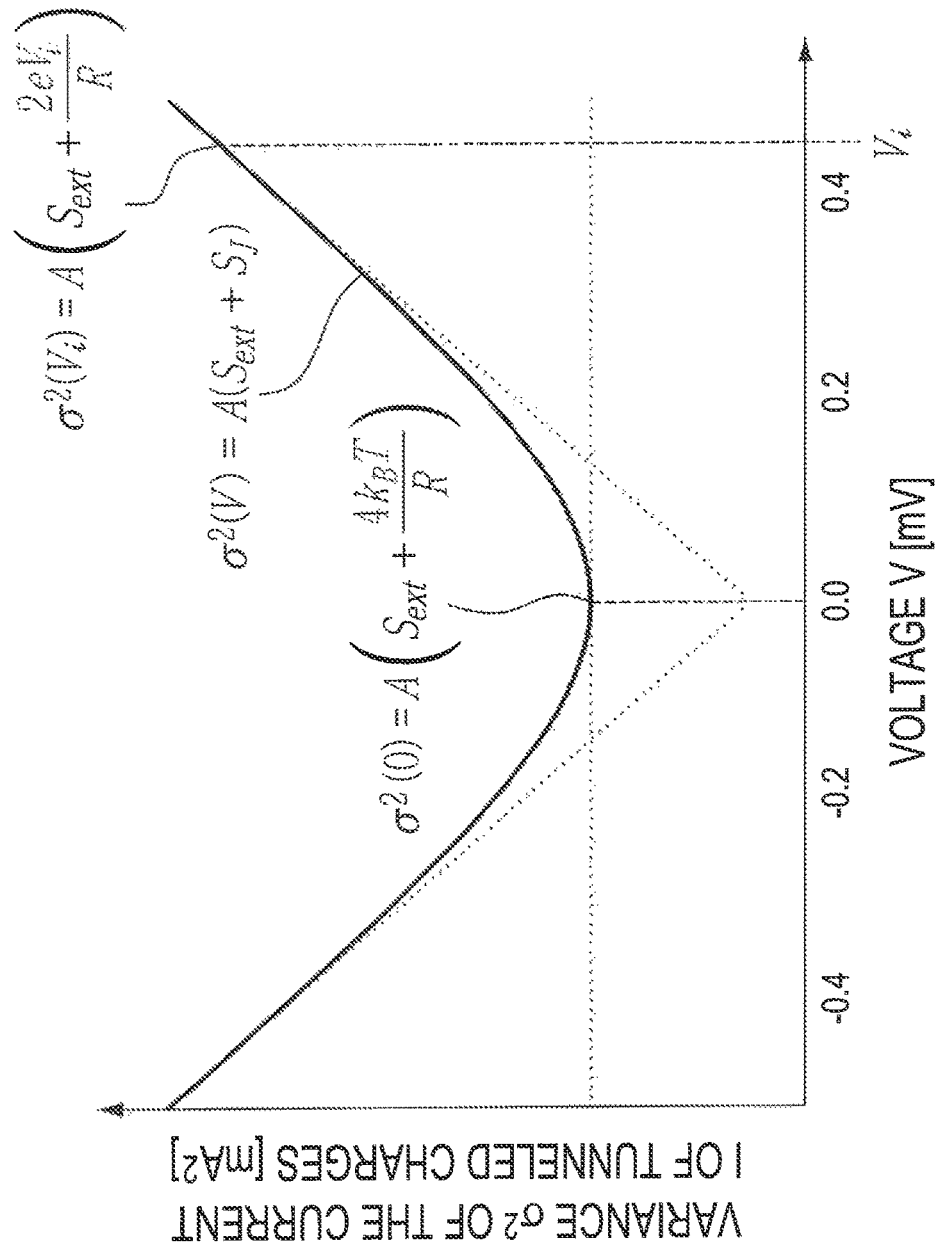
FIG. 5 is a graph showing a variance of raw bit samples obtained from the raw bit generator of FIG. 2.

An example of variance data $\sigma^2(V)$ is shown in FIG. 5 for convenience.

Again, the variance data $\sigma^2(V)$ of the quantum tunneling barrier can be determined during manufacture of the random bit generator and then stored on the memory system, to yield satisfactory results as long as the random bit generator is used within certain limits.

However, the variance data $\sigma^2(V)$ need not to be previously determined. Indeed, in some embodiments, the variance data $\sigma^2(V)$ can be determined by varying the voltage at which the quantum tunneling barrier is operated while measuring the variance of the raw bit sample(s).

In any case, the quantum contribution value $S_J$ can be given by an equation equivalent to the following equation:

$$S_j = \frac{2}{R}\frac{eV}{\cdot}\coth\left(\frac{eV}{2k_BT}\right), \quad (2a)$$

wherein e denotes the electron charge, V denotes a voltage at which the quantum tunneling barrier is operated, $k_B$ denotes the Boltzmann constant, and T denotes a temperature at which the quantum tunneling barrier is operated, as presented in Spietz, Lafe, et al. "Primary electronic thermometry using the shot noise of a tunnel junction." Science 300.5627 (2003).

Equation (2a) can be valid for frequencies f such that $hf \ll k_BT$, wherein h denotes the Planck constant. In practice at room temperature, the equation (2a) can be valid for frequencies $f \ll 6$ THz. Working at frequencies of 10 GHz can add an exponentially small correction.

As can be understood, equation (1) is not a linear equation. Accordingly, one could measure the variance $\sigma^2(V)$ at at least three voltage values to deduce the external contribution value $S_{ext}$, the temperature T and the effective gain A of the raw bit generator. For instance, one may use the ordinary least squares method in order to determine an equation for the variance $\sigma^2(V)$ of the raw bit samples, from which the external contribution value $S_{ext}$, the temperature T and the effective gain A can be deduced. In practice, one may select two voltage values greater than $k_BT/e$ in which case the variance $\sigma^2(V)$ of the raw bit samples can be linear as function of the voltage V: the slope of the linear relation can give the effective gain A whereas the y-intercept yield the external contribution $S_{ext}$. Then, one may deduce the temperature T from evaluating the linear relation at a null voltage.

As shown in FIG. 5, based on equations (1) and (2a) above, the external contribution value $S_{ext}$ can be determined from the variance data $\sigma^2(V)$ of the raw bit sample(s) in some other embodiments. More specifically, in some embodiments, the variance $\sigma^2(0)$ of the raw bit sample(s) when the voltage V is null can be given by a relation equivalent to the following relation:

$$\sigma^2(0) = A\left(S_{ext} + \frac{4k_BT}{R}\right). \quad (3)$$

Additionally or alternately, the variance $\sigma^2(V_i)$ of the raw bit sample(s) when the voltage $V_i$ is greater than a given voltage threshold $V_{thres} < V_i$ can be given by a relation equivalent to the following relation:

$$\sigma^2(V_i) = A\left(S_{ext} + \frac{2eV_i}{R}\right). \quad (4)$$

In this example, given the variance data $\sigma^2(V)$ of the raw bit samples and equations (2a), (3) and (4), the calibration data, e.g., the quantum contribution value $S_J$ and the external contribution value $S_{ext}$, can be determined, as the external contribution value $S_{ext}$ is known not to vary as function of the voltage at which the quantum tunneling barrier is operated. See Thibault, Karl, et al. "Pauli-heisenberg oscillations in electron quantum transport." Physical review letters 114.23 (2015), for example.

Accordingly, by knowing the relative contribution of each of the quantum contribution value $S_J$ and the external contribution value $S_{ext}$ relative to one another, one can determine how much of the raw bit samples can be associated to the quantum contribution and how much of the raw bit samples can be associated to the external contribution.

In the example described above, the quantum tunneling barrier is operated in a linear regime, which allows Ohm's Law (V=RI) to be used. Accordingly, the ratio V/I and the derivative dV/dI would be constant, and would yield the resistance R. However, in some other embodiments, the quantum tunneling barrier may not be operated in a linear regime but in a non-linear regime, in which case the ratio V/I and the derivative dV/dI are not constant. In this context, as long as the transport of charges through the quantum tunneling barrier occurs via quantum tunneling, the quantum contribution value $S_J$ is given by:

$$S_j = 2eI \cdot \coth\left(\frac{eV}{2k_BT}\right), \quad (2b)$$

wherein I denotes the current through the quantum tunneling barrier. In this context, the variance $\sigma^2(0)$ of the raw bit sample(s) when the voltage V is null is related to $$R = \frac{V}{I} = dV/dI$$

for I close to zero, and the variance $\sigma^2(V_i)$ of the raw bit sample(s) when the voltage $V_i$ is greater than a given voltage threshold $V_{thres} < V_i$ can be given by a relation equivalent to the following relation: $\sigma^2(V_i) = 2eI$. As can be understood, the non-linearities of the quantum tunneling barrier can stem from the height of the potential barrier of the quantum tunneling barrier not being infinite and/or the density of states in the electrical contacts depending on energy, for instance.

One method to determine how many of the bits of the raw bit samples are due to the quantum contribution involves determining a min-entropy $H_{\infty,Q}$ of the quantum contribution. According to one definition, the min-entropy $H_{\infty,Q}$ can be given by a relation equivalent to the following relation:

$$H_{\infty,Q} = -\log_2 p_{max,Q}, \quad (5)$$

where $p_{max,Q}$ denotes the largest of the probabilities of obtaining one or the other of the values of the instantaneous level of the raw signal having only the quantum contribution. However, it is determined that the variance of the raw bit sample $\sigma^2$ relates to a variance $\sigma_Q^2$ of the quantum contribution by a relation equivalent to the following relation:

$$\sigma_Q^2 = \frac{\gamma}{1+\gamma}\sigma^2, \quad (6)$$

where $\gamma$ denotes a ratio between the quantum contribution value and the external contribution value. For instance, the ratio $\gamma$ can be given by:

$$\gamma = \frac{S_j}{S_{ext}}. \quad (7)$$

Knowing that a min-entropy $H_\infty$ of the raw bit samples can be given by a relation equivalent to the following relation:

$$H_\infty = -\log_2 p_{max}, \quad (8)$$

wherein $p_{max}$ is the largest of the probabilities of obtaining one of the other of the raw bit samples. For instance, with reference to FIG. 3, $p_{max}$ would be the probability of obtaining a raw bit number of 011 (or 100). In practice, the processed raw signal may be indistinguishable from a Gaussian curve. In this case, if $I_{max}$ denotes the maximal value of the monitoror (e.g., sampler), two consecutive integers correspond to two currents separated by $$\Delta I = \frac{2I_{max}}{2^n - 1},$$

where n is the first bit number, and the largest of the probabilities $p_{max}$ and $p_{max,Q}$ are given by relations equivalent to the following relations:

$$p_{max} \cong \frac{\Delta I}{\sigma \sqrt{2\pi}}. \quad (9)$$

$$p_{max,Q} \cong \frac{\Delta I}{\sigma_Q \sqrt{2\pi}}. \quad (10)$$

Accordingly, using equations (5), (6), (8) and (10), one can obtain:

$$H_{\infty,Q} = H_\infty - \frac{1}{2}\log_2 \frac{1+\gamma}{\gamma}, \quad (11)$$

As the min-entropy $H_\infty$ of the raw bit samples and the ratio $\gamma$ can be determined as described above, the min-entropy $H_{\infty,Q}$ of the quantum contribution can also be determined. The min-entropy $H_{\infty,Q}$ of the quantum contribution can be used to determine how many bits of the raw bit samples are due to the quantum contribution, and thus can be used as an input to the randomness extractor.

For instance, in a given embodiment, for n=14 bits and $I_{max}=3\sigma$, one can obtain a min-entropy $H_\infty$ for the raw data of 12.7 bits per raw bit sample. For an amplifier with voltage noise of 1.4 nV per root Hz, the external contribution value $S_{ext}$ may be determined to be $2 \times 10^{-18} V^2/Hz$. For a quantum tunneling barrier having a resistance R=50 Ohms operated at a voltage V=0.4 V, the quantum contribution value $S_J$ may be determined to be $2eVR = 6.4 \times 10^{-18} V^2/Hz$, which would yield a ratio $\gamma$ of 3.2. In this case, the min-entropy $H_{\infty,Q}$ may be given by 12.5 bits per raw bit sample. In this case, a security factor of 0.3 bit per raw bit sample may be used, which would result in extracting the randomness out of the raw bit samples in order to keep 12.2 bits per raw bit sample of initially 14 bits. In such an embodiment, if the first bit number n of the raw bit sample is 14, the second bit number m may be floored to 12. By doing so, 0.2 bits per raw bit sample which are generally associated to satisfactory quality of randomness can be lost.

Since the throughput of random bit generators is of importance in some applications, losing these 0.2 bits per raw bit sample may be inconvenient. To avoid this, it may be convenient to use a concatenator. In such embodiments, the monitoror is configured to provide source bit samples having a source bit number of 14, and that it is determined that, based on the min-entropy $H_{\infty,Q}$ of the quantum tunneling fluctuations, 12.2 bits per source bit sample are to be kept, the concatenator can be used to concatenate a number of source bit samples to one another so as to minimize that loss. For instance, the number of source bit samples to concatenate to one another can correspond to the number which can, when multiplied by the number of bits per raw bit sample to keep, yield an integer. For instance, in this specific example, if the number of bits per raw bit sample to keep is 12.2 bits, multiplying 12.2 bits per 5, 10 or any multiple of 5 will yield an integer. Accordingly, it may be preferred that any raw bit sample be the result of the concatenation of 5, 10 or any multiple of 5 source bit samples, to avoid loss of bits associated to satisfactory quality of randomness.

The randomness extraction can be performed using a plurality of different algorithms. Examples of such algorithms may include the least significant bit method, the non-universal hash functions, the Trevisan's extractor and/or the universal hash functions such as the Toeplitz-hash function. In some embodiments, the Trevisan's extractor and the universal hash functions may be preferred as they are considered to be information-theoretically provable. See Mansour, Yishay, Noam Nisan, and Prasoon Tiwari. "The computational complexity of universal hashing." Theoretical Computer Science 107.1 (1993); Ma, Xiongfeng, et al. "Postprocessing for quantum random-number generators: Entropy evaluation and randomness extraction." Physical Review A 87.6 (2013); and Xu, Feihu, et al. "Ultrafast quantum random number generation based on quantum phase fluctuations." Optics express 20.11 (2012).

An example of a randomness extractor involves the use of a Toeplitz-hash method. In this embodiment, a m×n Toeplitz random matrix T is built. Each raw bit sample of n bits is multiplied by the random matrix T to give random bit samples of m bits. In this case, m is given by the min-entropy $H_{\infty,Q}$ of the quantum contribution minus any eventual security factor, and of course the second bit number m is smaller than the min-entropy $H_\infty$ of the raw bit samples of n bits. In this extraction process, n−m bits are discarded.

For example, let us consider 100 source bit samples of 14 bits are concatenated to one another to form a raw bit number having a first bit number corresponds to 1400. The min-entropy $H_\infty$ of the source bit samples may be 12.7 bits per source bit sample. The min-entropy $H_{\infty,Q}$ of the quantum signal may be 12.5 bits per raw bit sample. Taking a security factor of 0.3 bit per raw bit sample, 12.2 bits out of the initial 14 bits may be kept. Thus, in this example, the second bit number m corresponds to 1200. As can be noticed, the number of source bit samples, i.e. 100, which are concatenated to one another to form the raw bit number, when multiplied by the number of bits to keep, i.e., 12.2 in this example, yields an integer and thus avoid loss of bits associated to satisfactory quality of randomness. The first bit number n and the security factor can be chosen depending on the rate of bits per second needed and on the level of security required. The random matrix T may be generated using a random bit seed of n+m−1 random bits, which may be taken from the raw bit sample keeping for instance the least significant bit of each raw bit sample for a short period of time. It can be reinitialized as often as desired, an example of which is described below with reference to FIG. 7.

It is contemplated that a typical quantum tunneling barrier has a bandwidth of about 600 MHz. To avoid undesirable correlation between successive raw bit samples, the sampling can generally be performed at a sampling rate of 1200 MS/s, if a satisfactory anti-aliasing filter is used. For example, let the sampling rate be 800 MS/s and a first bit number of 14 bits, this can yield a rate of generation of raw bit samples of 11.2 Gb/s, so a rate of generation of random bit samples of 9.6 Gb/s. In a prototype, a sampling rate of 125 MS/s was satisfactorily used, which yield a rate of generation of raw bit samples of 1.75 Gb/s. A limiting feature in such an embodiment is generally the rate at which the random bit samples can be transferred over to the electronic device.

It is contemplated that an amplifier does not only add voltage fluctuations e(t) to the voltage $V_{in}$ it measures, it can also add a fluctuating current i(t) into what is connected to its input, so the voltage measured $V_{out}$ at its output can be given by:

$$V_{out}=G(V_{in}+e+Ri),$$

wherein G denotes the effective gain of the amplifier and R denotes the differential resistance R=dV/dI of the quantum tunneling barrier. As a consequence, the amplifier can contribute to the measured voltage noise by $<e^2>+R<ei>+R^2<i^2>$. The first term $<e^2>$ represents the voltage noise of the amplifier, the third term $R^2<i^2>$ represents the current noise of the amplifier into the resistance of the junction, and the second term $R<ei>$ involves correlations between current and voltage noises (and is usually negligible). This quantity depends on the bias current in the junction if R does. This can be taken into account when fitting the total noise vs. bias voltage/current. Accordingly, using an amplifier with low current noise and/or a junction with low enough resistance so that the third term $R^2<i^2>$ is negligible compared to the first term $<e^2>$ can reduce undesirable effects generally associated to current noise of the amplifier.

Figure 6:
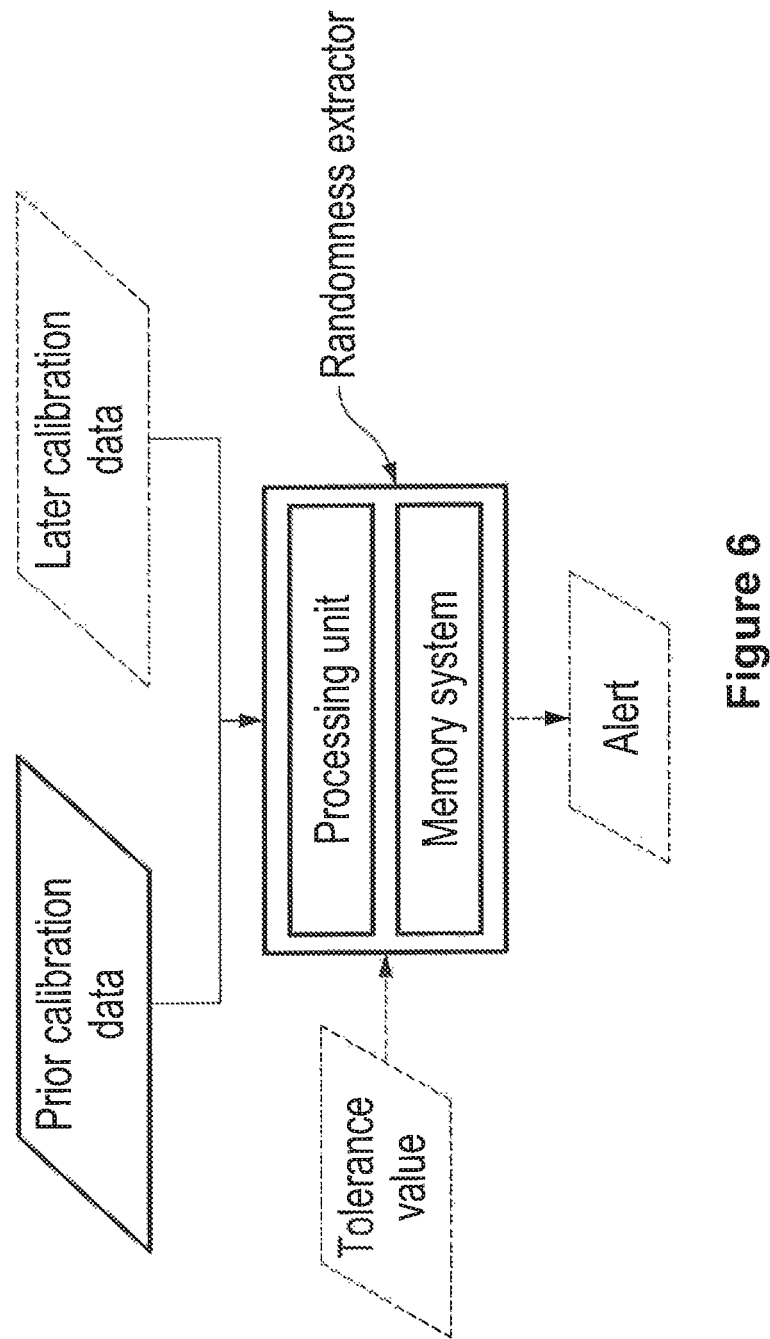
FIG. 6 is a schematic view of an example of the randomness extractor of FIG. 4 shown generating an alert when the difference between prior calibration data and later calibration data is above a given tolerance value.

FIG. 6 is a schematic view of the randomness extractor. In this embodiment, the randomness extractor receives prior calibration data and later calibration data, compares the prior calibration data and later calibration data to one another, and then generates an alert when the prior calibration data differ from the later calibration data by more than a tolerance value. More specifically, the prior calibration data have been determined at a first moment in time $t_1$ whereas the later calibration data have been determined at a second moment in time $t_2$, which is subsequent to the first moment in time $t_1$. Accordingly, the alert so-generated can provide a diagnostic as to whether the random bit samples generated are trustable.

For instance, in one embodiment, the prior calibration data may have been determined provided in the form of prior variance data $\sigma_{t1}^2(V)$ determined during the manufacture of the random bit generator and stored on the memory system. In this embodiment, the later calibration data can be provided in the form of later variance data $\sigma_{t2}^2(V)$ determined in real time or in real time by varying the voltage at which the quantum tunneling barrier is operated while measuring the variance $\sigma t^2$.

As can be understood, if a significant difference exists between the prior variance data $\sigma_{t1}^2(V)$ and the later variance data variance data $\sigma_{t2}^2(V)$, it may be indicative that the random bit generator is used outside some predefined limits such as outside a predefined temperature range. In addition, such a difference may also be indicative that the random bit generator is being modified/altered by a third party adversary, in which case the alert so-generated could justify such an alert.

As can be understood, the randomness extractor can be configured so that such a diagnostic is repeated either at a given frequency or on demand.

Figure 7:
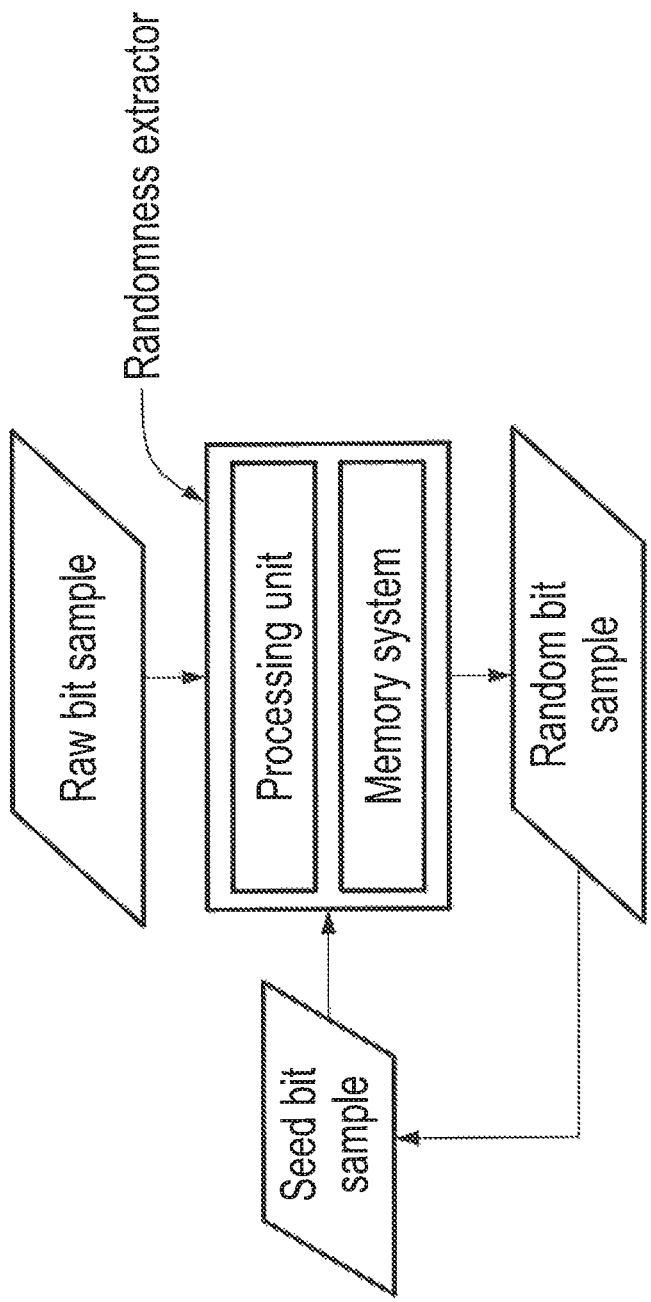
FIG. 7 is a schematic view of an example of the randomness extractor of FIG. 4 using a seed bit sample being iteratively substituted with random bit samples received from the randomness extractor.

Now referring to FIG. 7, it is contemplated that the randomness extraction can involve a random bit seed. For instance, in this embodiment, the extraction may require a random matrix, which is generated using the random bit seed prior to actually extracting the randomness out of the raw bit samples. For instance, the raw bit samples can be multiplied by the random matrix so as to provide the random bit samples during the extraction. Although the initial seed bit sample may only have a pseudo randomness, the resulting random bit can be of satisfactory randomness due to the shuffling and/or removal bits during the extraction. However, in this embodiment, the randomness extractor generates a random bit sample by multiplying the raw bit sample to the so-called pseudo-random matrix, after which the random bit seed used for generating the random matrix can be substituted for the random bit sample so-generated. In this case, the random matrix which may be pseudo-random in the first place can quickly become a random matrix, which may yield random bit samples of increased randomness.

Figure 8:
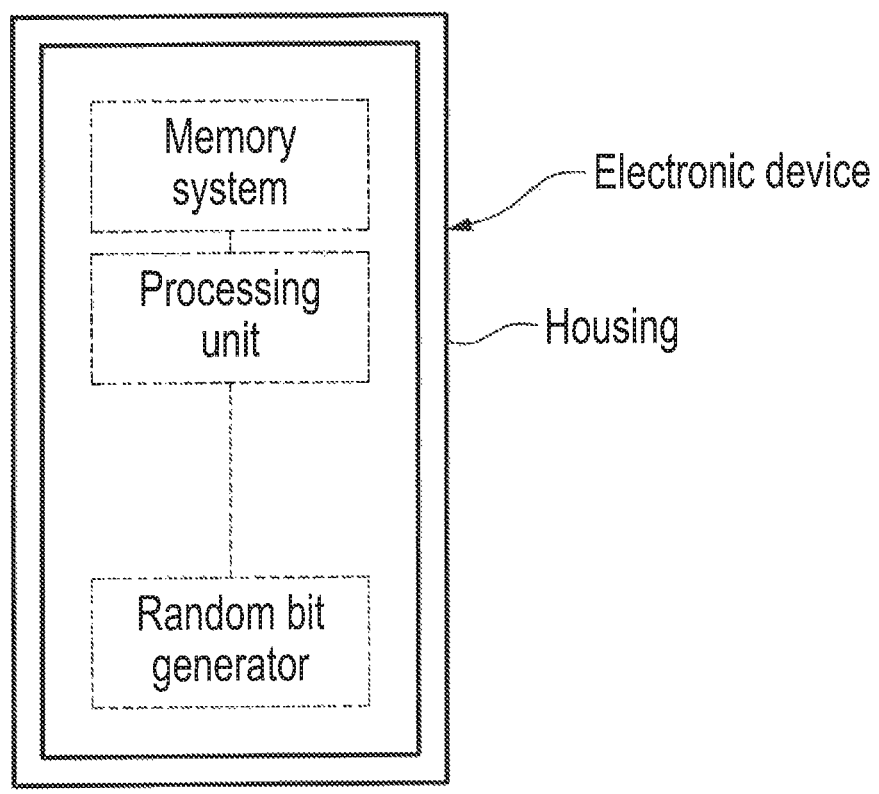
FIG. 8 is a front elevation view of an example of an electronic device incorporating the random bit generator of FIG. 1.

FIG. 8 shows an example of an electronic device incorporating the random bit generator. More specifically, the electronic device has a housing inside which is mounted the random bit generator. As can be understood, the electronic device can be a smart phone, a tablet, electronic credit or debit cards, a laptop, a television and the like, depending on the application. Moreover, in some embodiments, the electronic device can be provided in the form of a computer, a server and the like which is accessible via a network such as the Internet via wired and/or wireless connections.

As shown in this embodiment, the electronic device has a processing unit and a memory system which are separate and communicatively coupled (e.g., wired and/or wireless communication) to the random bit generator. In some other embodiments, the processing unit and the memory system of the electronic device can act as the randomness extractor, in which case the raw bit generator is communicatively coupled to the processing unit and/or to the memory system of the electronic device.

Figure 9:
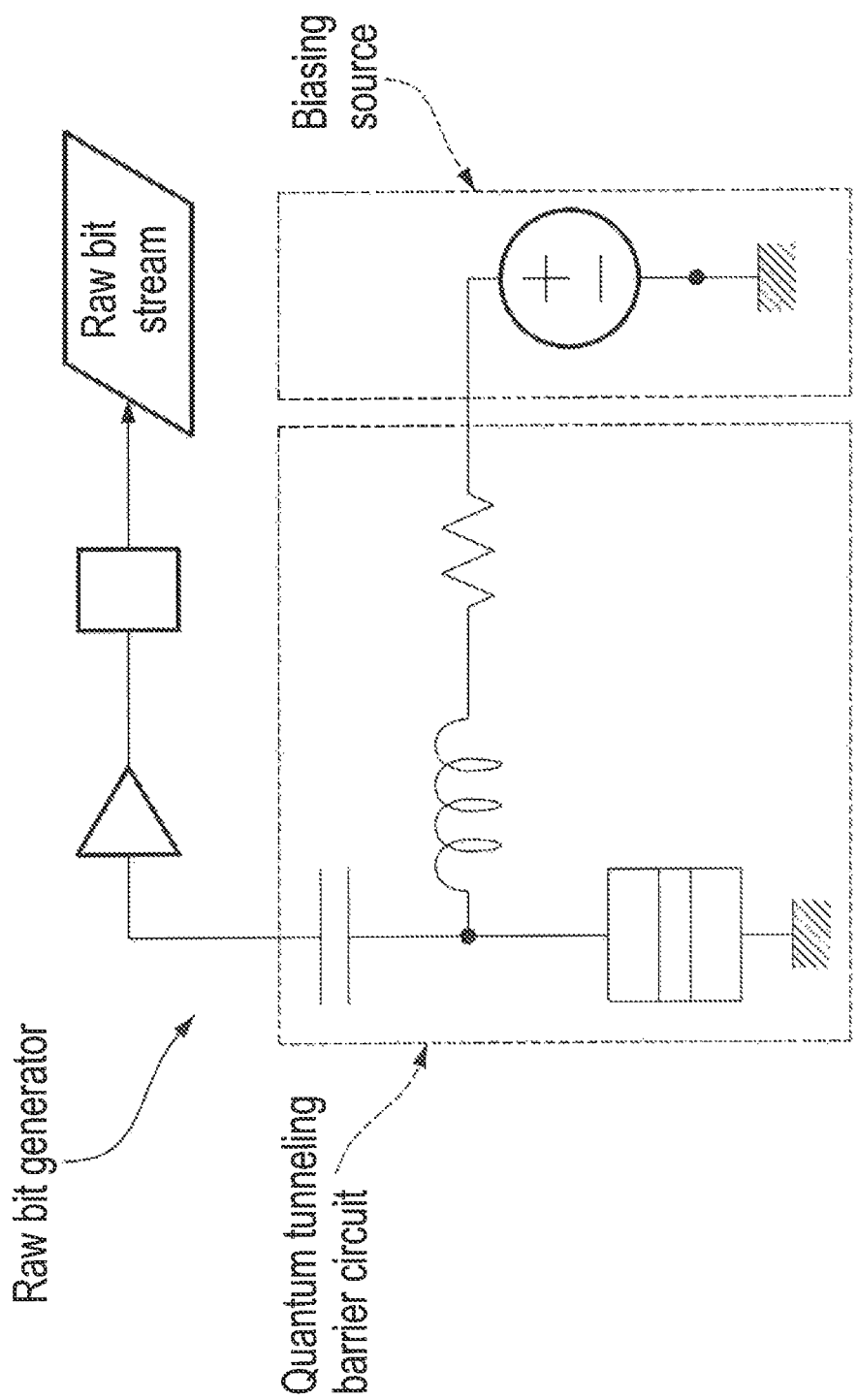
FIG. 9 is a schematic view of an example of a quantum tunneling barrier circuit of FIG. 2.

FIG. 9 shows an example of a raw bit generator. The raw bit generator generally comprises a board (not shown) on which the quantum tunneling barrier circuit is mounted. As shown, the quantum tunneling barrier circuit of the raw bit generator can include the quantum tunnelling barrier, capacitor(s), inductor(s), and resistor(s). A biasing source is provided for varying the voltage at which the quantum tunneling barrier is operated. In this example, the raw signal stemming from the quantum tunneling barrier circuit is amplified using an amplifier. A stream of raw bit samples is obtained using the monitoror, provided in this example in the form of a sampler which samples the amplified raw signal stemming from the amplifier. As can be understood, the quantum tunneling barrier circuit, the biasing source, the amplifier and the monitoror are mountable on the board. For instance, the board may be a printed circuit board (PCB) that mechanically supports the components and electrically connects the components to one another via conductive tracks etched from copper sheets laminated onto a non-conductive substrate.

As mentioned above, the quantum tunnelling barrier can be provided in the form of a quantum tunnelling component having a quantum tunnelling barrier in the form of one or more insulator layers sandwiched between conductive layers acting as conductors. It is noted that the conductive layers can be made of a metallic material or of a semiconductor material, for instance, while the insulator layer can be made of any material which satisfactorily inhibits the free conduction of electrons (or holes) thereacross via classical reflection. The insulator layer has two exterior opposite faces each in contact with a corresponding one of the two conductive layers and the two conductive layers can be connectable to a first terminal and a second terminal of a biasing source. It may be appreciated that the biasing source may be either mounted on the board and fixedly connected to the conductive layers of the quantum tunnelling barrier or be provided separately thereto.

In this embodiment, the biasing source can be used to perform a step of varying the voltage at which the quantum tunneling barrier is operated. The amplifier can be adapted to perform a step of amplifying the raw signal provided by the quantum tunneling barrier circuit. The sampler can be adapted to perform a step of sampling the raw signal and the filter can be adapted to perform the step of filtering the raw signal. The filter can be connected to the quantum tunnelling barrier, which is, in turn, connected to the amplifier and then to the sampler. When operatively connected one to the others, the raw bit generator can monitor the raw signal in order to obtain a raw bit sample. Moreover, the biasing source can fix the difference of potential applied to the quantum tunnelling barrier. The biasing source can also be varied so as to allow on-board measurement of the variance σ(V) of the raw bit samples.

Figure 10A:
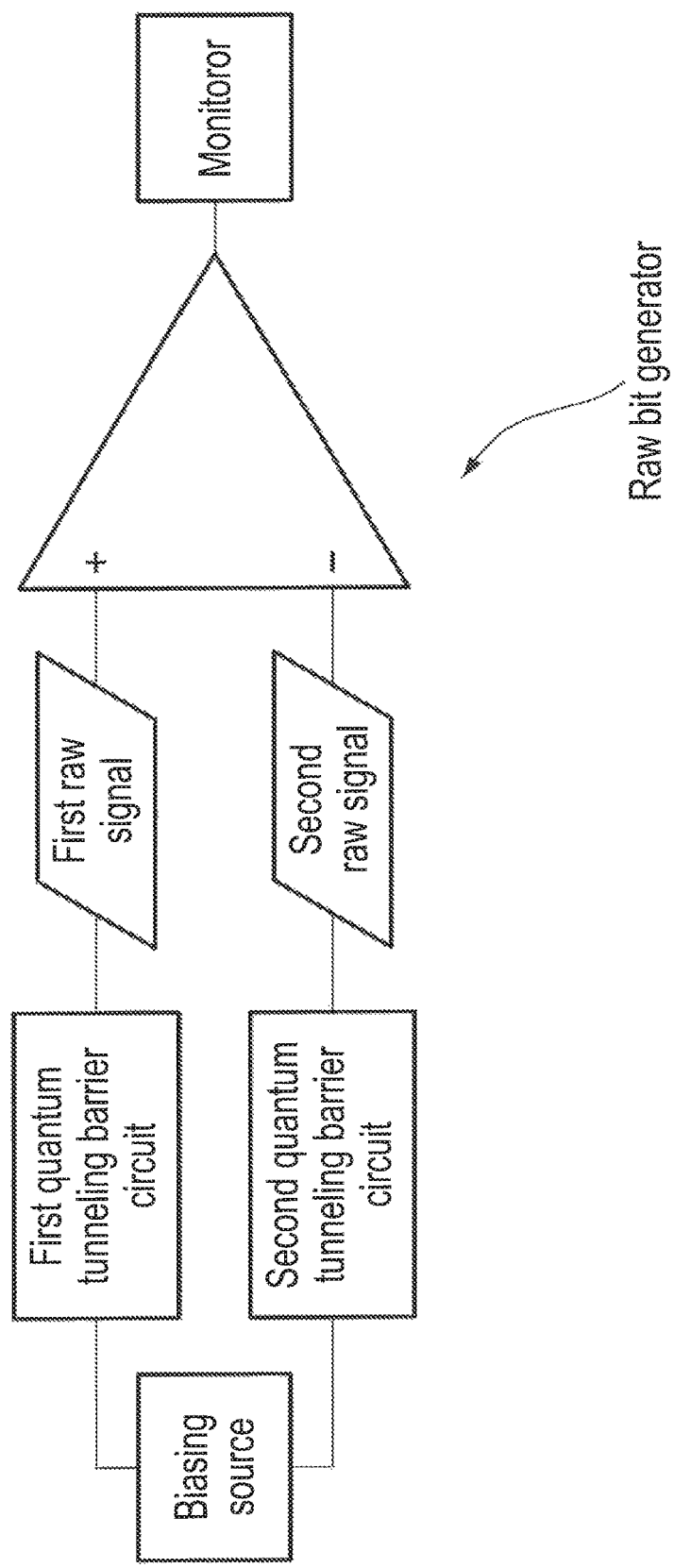
FIG. 10A is a schematic view of another example of a raw bit generator, with two quantum tunneling barrier circuits.

FIG. 10A shows another example of a raw bit generator, in accordance with another embodiment. As may be appreciated, in order to lower the effect of external contribution, a differential circuit having two quantum tunneling barrier circuits can be advantageously used in some embodiments. As shown, the raw bit generator has a differential amplifier which is configured to amplify the difference between the first and second raw signals provided respectively by the first quantum tunneling barrier circuit and the second quantum tunneling barrier circuit. More specifically, in this example, the first and second quantum tunneling barriers are biased by a common biasing source. In this embodiment, the biasing source is used to apply a DC current or voltage to the first and second quantum tunneling barrier circuits. High-pass filters can be included in each quantum tunneling barrier circuit to remove low frequency components in the first and second raw signals in this embodiment. Indeed, the high pass filters are used to separate the DC from the fluctuations at finite frequency which are the raw signal one aims at isolating and detecting. Still in this example, an analog-to-digital monitoror is provided to monitor the output of the differential amplifier and provide raw bit sample(s). Common external contribution may be suppressed using such a configuration.

Figure 10B:
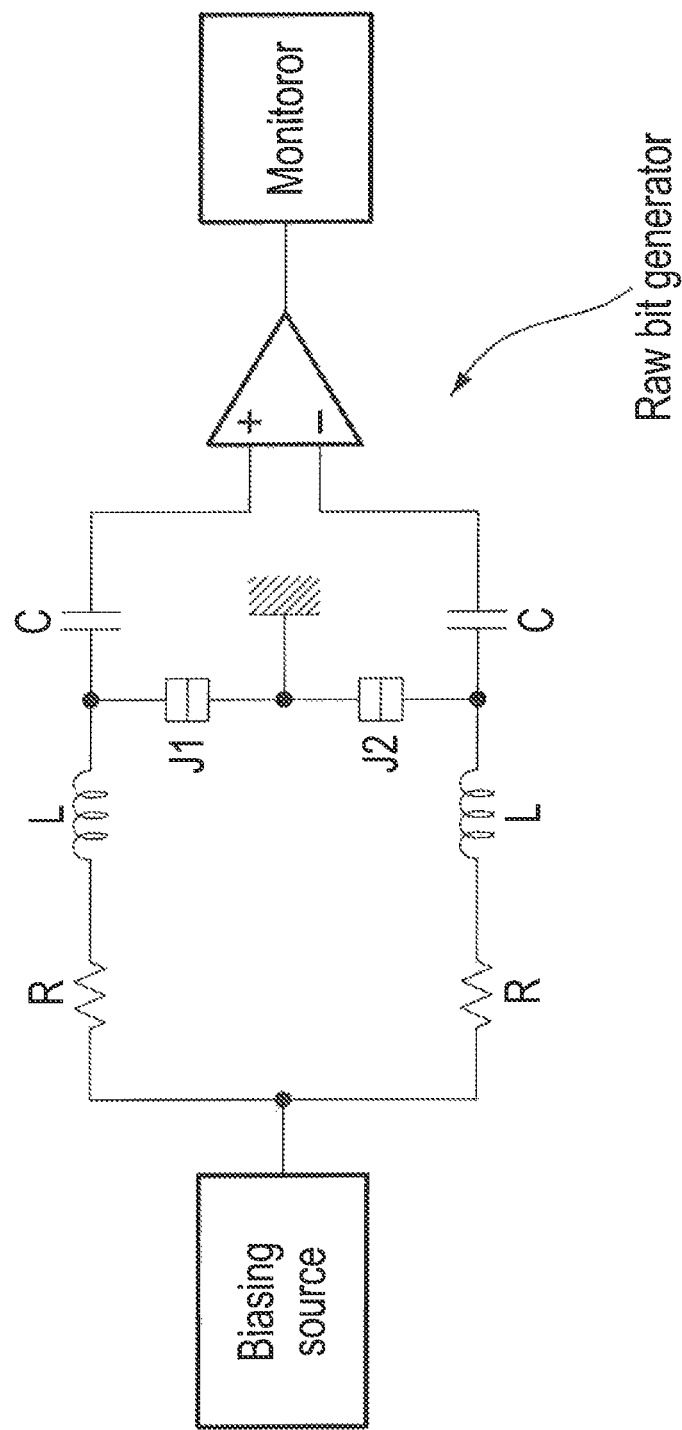
FIG. 10B is an electrical circuit of the raw bit generator of FIG. 10A.

An electrical circuit of such a raw bit generator is shown in FIG. 10B. As depicted, the biasing source generates the voltage $V_0$ used to bias the first and second quantum tunneling barrier circuits. The resistors R are used to limit the current of tunneled charges generated by the first and second quantum tunneling barriers. The inductors and/or capacitors separate the DC component from the AC fluctuations of the raw signals. In this example, the capacitors act as the high-pass filters. In this embodiment, the possible noise on the voltage $V_0$ has no influence on the measurement in the end as the two branches of the raw bit generator are symmetric to one another. They may thus cancel themselves.

FIG. 10C shows an image of a pair of quantum tunneling barriers of the raw bit generator of FIG. 10A. As shown, the pair of quantum tunneling barriers can be fabricated using a common contact using photo-lithography techniques. In the illustrated example, a first layer of aluminum (about 200 nm-thick) is deposited on a substrate to make the common contact GND that is connected to the ground of the circuit. The first layer is oxidized using pure oxygen to make a quantum tunneling barrier of about 1 nm-thick. A second layer of aluminum is deposited (about 300 nm-thick) to make the contact C1 and contact C2. Each of the contacts 1 and 2 overlaps the first layer, and the overlap defines the quantum tunneling barriers J1 and J2.

As can be understood, the examples described above and illustrated are intended to be exemplary only. In some embodiments, the monitoror can be configured to identify crossings of the instantaneous level of the current across a given value as the instantaneous level of the current varies and to determine a period of time elapsed between two successive crossings. In these embodiments, a value is attributed to the period of time elapsed, and forms the raw bit sample. For instance, the monitoror can identify that the instantaneous level of the current crosses a zero value at a first moment in time and then crosses back the zero value at a second moment in time. Accordingly, the value attributed to the raw bit sample will be the difference between the first moment in time and the second moment in time, or vice versa. Similarly as when using a sampler, source bit samples can be obtained from identifying passages of the instantaneous value at the given value and determining periods of time elapsed between two successive passage of the instantaneous level of the current at the given value. In these embodiments, a concatenator may as well be used to concatenate the source bit samples to one another to provide the raw bit sample. The scope is indicated by the appended claims.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A method for generating a random bit sample using a quantum tunneling barrier comprising an insulator sandwiched between two conductors, the method comprising:

generating a current of charges tunneling from a first one of the two conductors to a second one of the two conductors and across the insulator, the current of the tunneled charges having an instantaneous level varying randomly due to quantum tunneling fluctuations and forming a raw signal;

from said raw signal, obtaining a raw bit sample having a first bit number n, the first bit number n being an integer; and extracting the randomness out of the raw bit sample into the random bit sample, the random bit sample having a second bit number m being smaller than the first bit number n, said extracting being based on calibration data comprising at least a quantum contribution value of said quantum tunneling fluctuations in said raw bit sample; and an external noise contribution value in said raw bit sample;

wherein said calibration data are received from an accessible memory system.

2. The method of claim 1 wherein said second bit number m is based on a number of bits to keep per raw bit sample, the second bit number m being determined based on a min-entropy of said quantum tunneling fluctuations, said min-entropy of said quantum tunneling fluctuations depending on said quantum contribution value and said external noise contribution value.

3. The method of claim 1 wherein said extracting comprises determining said calibration data from variance data indicative of a variance of raw bit samples obtained from said quantum tunneling barrier as function of a voltage at which the quantum tunneling barrier is operated.

4. The method of claim 3 wherein said variance data is given by a relation equivalent to the following relation:

$$\sigma^2 = A(S_J + S_{ext}),$$

wherein $\sigma^2$ denotes said variance data, A denotes an effective gain of said obtaining, $S_J$ denotes said quantum contribution value of the quantum tunneling fluctuations in the raw bit sample, and $S_{ext}$ denotes an external noise contribution value in the raw bit sample.

5. The method of claim 4 wherein said quantum contribution value $S_J$ is given by a relation equivalent to the following relation:

$$S_j = \frac{2eV}{R} \cdot \coth\left(\frac{eV}{2k_B T}\right),$$

wherein e denotes the electron charge, R denotes a resistance of the quantum tunneling barrier, V denotes a voltage at which the quantum tunneling barrier is operated, $k_B$ denotes the Boltzmann constant, and T denotes a temperature at which the quantum tunneling barrier is operated.

6. The method of claim 4 wherein said external noise contribution value $S_{ext}$ is determined at least from one of a value of said variance data $\sigma^2$ at a null voltage given by a relation equivalent to the following relation:

$$\sigma^2(0) = A\left(S_{ext} + \frac{4k_B T}{R}\right),$$

and a value of said variance data $\sigma^2$ at a voltage $V_i$ being greater than a given voltage threshold $V_{thres}$ can be given by a relation equivalent to the following relation:

$$\sigma^2(V_i) = A\left(S_{ext} + \frac{2eV_i}{R}\right);$$

wherein e denotes the electron charge, R denotes a resistance of the quantum tunneling barrier, $V_i$ denotes a voltage at which the quantum tunneling barrier is operated, $k_B$ denotes the Boltzmann constant, and T denotes a temperature at which the quantum tunneling barrier is operated.

7. The method of claim 3 further comprising determining said variance data by varying the voltage at which the quantum tunneling barrier is operated and measuring a variance of the raw bit sample as said voltage is varied.

8. The method of claim 3 wherein said variance data are received from an accessible memory system.

9. The method of claim 1 wherein said extracting comprises:

comparing prior calibration data indicative of the calibration data at a prior moment in time to later calibration data indicative of the calibration data at a later moment in time, and generating an alert when the prior calibration data differ from the later calibration data by more than a tolerance value.

10. The method of claim 9 wherein said comparing comprises determining current calibration data from current variance data obtained by varying a voltage at which the quantum tunneling barrier is operated while measuring a variance of the raw bit sample, said current calibration data corresponding to said later calibration data.

11. The method of claim 1 wherein said obtaining includes obtaining a plurality of source bit samples and concatenating the plurality of source bit samples into the raw bit sample.

12. The method of claim 11, further comprising determining a number of bits to keep per source bit sample based on a min-entropy of said quantum tunneling fluctuations, the raw bit sample including a given number of concatenated source bit samples, said given number being determined so that, when multiplied by said number of bits to keep, yields an integer.

13. The method of claim 1 wherein said extracting includes multiplying the raw bit sample to a random matrix generated using an initial seed bit sample to obtain said random bit sample.

14. The method of claim 13, wherein said raw bit sample is a first raw bit sample and said random bit sample is a first random bit sample, the method further comprising repeating said obtaining to obtain a second raw bit sample, generating another random matrix using at least part of said first random bit sample as the initial seed bit sample, and repeating said extracting on the second raw bit sample using said other random matrix.

15. The method of claim 1 further comprising repeating said obtaining to obtain a plurality of successive raw bit samples and repeating said extracting on each successive one of said raw bit samples thereby producing a random bit stream.

16. The method of claim 1 wherein said obtaining includes sampling the raw signal, including attributing a value to the instantaneous level of the current.

17. The method of claim 16 wherein the raw bit sample corresponds to the value of the instantaneous level of the current.

18. The method of claim 16 wherein said obtaining includes obtaining a source bit sample from said attributing, the source bit sample corresponding to the value of the instantaneous level of the current, further comprising repeating said sampling to obtain a plurality of source bit samples, and concatenating the plurality of source bit samples into the raw bit sample.

19. The method of claim 1 wherein said obtaining includes identifying crossings of the instantaneous level of the current across a given value as the instantaneous level of the current varies and determining a period of time elapsed between two successive crossings, including attributing a value to said period of time elapsed.

20. The method of claim 19 wherein said obtaining includes obtaining a source bit sample from said attributing, the source bit sample corresponding to said period of time elapsed, further comprising repeating said identifying and said determining to obtain a plurality of source bit samples, and concatenating the plurality of source bit samples into the raw bit sample.

21. The method of claim 1 further comprising amplifying said raw signal.

22. The method of claim 1 wherein said calibration data are previously determined and are stored on the accessible memory system.

23. A system for generating a random bit sample, the system comprising:
a quantum tunneling barrier circuit having a quantum tunneling barrier incorporating an insulator sandwiched between two conductors, a current of charges tunneling from a first one of the two conductors to a second one of the two conductors and across the insulator, the current of the tunneled charges having an instantaneous level varying randomly due to quantum tunneling fluctuations and forming a raw signal;
a monitoror configured to received said raw signal and to, from said raw signal, obtain a raw bit sample having a first bit number n, the first bit number n being an integer; and
a randomness extractor configured to extract the randomness out of the raw bit sample into the random bit sample, the random bit sample having a second bit number m being smaller than the first bit number n, said extracting being based on calibration data comprising at least a quantum contribution value of said quantum tunneling fluctuations in said raw bit sample; and an external noise contribution value in said raw bit sample;
wherein said calibration data are received from an accessible memory system.

24. The system of claim 23 wherein said second bit number m is based on a number of bits to keep per raw bit sample, the second bit number m being determined based on a min-entropy of said quantum tunneling fluctuations, said min-entropy of said quantum tunneling fluctuations depending on said quantum contribution value and said external noise contribution value.

25. The system of claim 23 wherein said extracting comprises determining said calibration data from variance data indicative of a variance of raw bit samples obtained from said quantum tunneling barrier as function of a voltage at which the quantum tunneling barrier is operated.

26. The system of claim 25 wherein said variance data is given by a relation equivalent to the following relation:

$$\sigma^2 = A(S_J + S_{ext}),$$

wherein $\sigma^2$ denotes said variance data, A denotes an effective gain of said obtaining, $S_J$ denotes said quantum contribution value of the quantum tunneling fluctuations in the raw bit sample, and $S_{ext}$ denotes an external noise contribution value in the raw bit sample.

27. The system of claim 26 wherein said quantum contribution value $S_J$ is given by a relation equivalent to the following relation:

$$S_J = \frac{2eV}{R} \cdot \coth\left(\frac{eV}{2k_BT}\right),$$

wherein e denotes the electron charge, R denotes a resistance of the quantum tunneling barrier, V denotes a voltage at which the quantum tunneling barrier is operated, $k_B$ denotes the Boltzmann constant, and T denotes a temperature at which the quantum tunneling barrier is operated.

28. The system of claim 26 wherein said external noise contribution value $S_{ext}$ is determined at least from one of a value of said variance data $\sigma^2$ at a null voltage given by a relation equivalent to the following relation:

$$\sigma^2(0) = A\left(S_{ext} + \frac{4k_BT}{R}\right),$$

and a value of said variance data $\sigma^2$ at a voltage $V_i$ being greater than a given voltage threshold $V_{thres}$ can be given by a relation equivalent to the following relation:

$$\sigma^2(V_i) = A\left(S_{ext} + \frac{2eV_i}{R}\right);$$

wherein e denotes the electron charge, R denotes a resistance of the quantum tunneling barrier, $V_i$ denotes a voltage at which the quantum tunneling barrier is operated, $k_B$ denotes the Boltzmann constant, and T denotes a temperature at which the quantum tunneling barrier is operated.

29. The system of claim 25 further comprising determining said variance data by varying the voltage at which the quantum tunneling barrier is operated and measuring a variance of the raw bit sample as said voltage is varied.

30. The system of claim 23 further comprising an amplifier configured to amplify said raw signal.

31. A method for generating a random bit sample using a quantum tunneling barrier comprising an insulator sandwiched between two conductors, the method comprising:
generating a current of charges tunneling from a first one of the two conductors to a second one of the two conductors and across the insulator, the current of the tunneled charges having an instantaneous level varying randomly due to quantum tunneling fluctuations and forming a raw signal;
from said raw signal, obtaining a raw bit sample having a first bit number n, the first bit number n being an integer; and
extracting the randomness out of the raw bit sample into the random bit sample, the random bit sample having a second bit number m being smaller than the first bit number n, said extracting being based on calibration data comprising at least
a quantum contribution value of said quantum tunneling fluctuations in said raw bit sample; and
an external noise contribution value in said raw bit sample;
wherein said extracting comprises:
comparing prior calibration data indicative of the calibration data at a prior moment in time to later calibration data indicative of the calibration data at a later moment in time, and generating an alert when the prior calibration data differ from the later calibration data by more than a tolerance value.

32. The method of claim 31 wherein said comparing comprises:

determining current calibration data from current variance data obtained by varying a voltage at which the quantum tunneling barrier is operated while measuring a variance of the raw bit sample, said current calibration data corresponding to said later calibration data.

33. A method for generating a random bit sample using a quantum tunneling barrier comprising an insulator sandwiched between two conductors, the method comprising:

generating a current of charges tunneling from a first one of the two conductors to a second one of the two conductors and across the insulator, the current of the tunneled charges having an instantaneous level varying randomly due to quantum tunneling fluctuations and forming a raw signal;

from said raw signal, obtaining a raw bit sample having a first bit number n, the first bit number n being an integer;

extracting the randomness out of the raw bit sample into the random bit sample, the random bit sample having a second bit number m being smaller than the first bit number n, said extracting being based on calibration data comprising at least a quantum contribution value of said quantum tunneling fluctuations in said raw bit sample; and an external contribution value in said raw bit sample;

wherein said obtaining includes obtaining a plurality of source bit samples and concatenating the plurality of source bit samples into the raw bit sample; and determining a number of bits to keep per source bit sample based on a min-entropy of said quantum tunneling fluctuations, the raw bit sample including a given number of concatenated source bit samples, said given number being determined so that, when multiplied by said number of bits to keep, yields an integer.

34. A method for generating a random bit sample using a quantum tunneling barrier comprising an insulator sandwiched between two conductors, the method comprising:

generating a current of charges tunneling from a first one of the two conductors to a second one of the two conductors and across the insulator, the current of the tunneled charges having an instantaneous level varying randomly due to quantum tunneling fluctuations and forming a raw signal;

from said raw signal, obtaining a raw bit sample having a first bit number n, the first bit number n being an integer; and extracting the randomness out of the raw bit sample into the random bit sample, the random bit sample having a second bit number m being smaller than the first bit number n, said extracting being based on calibration data comprising at least a quantum contribution value of said quantum tunneling fluctuations in said raw bit sample; and an external contribution value in said raw bit sample;

wherein said extracting includes multiplying the raw bit sample to a random matrix generated using an initial seed bit sample to obtain said random bit sample; and wherein said raw bit sample is a first raw bit sample and said random bit sample is a first random bit sample, the method further comprising repeating said obtaining to obtain a second raw bit sample, generating another random matrix using at least part of said first random bit sample as the initial seed bit sample, and repeating said extracting on the second raw bit sample using said other random matrix.

35. A method for generating a random bit sample using a quantum tunneling barrier comprising an insulator sandwiched between two conductors, the method comprising:

generating a current of charges tunneling from a first one of the two conductors to a second one of the two conductors and across the insulator, the current of the tunneled charges having an instantaneous level varying randomly due to quantum tunneling fluctuations and forming a raw signal;

from said raw signal, obtaining a raw bit sample having a first bit number n, the first bit number n being an integer; and extracting the randomness out of the raw bit sample into the random bit sample, the random bit sample having a second bit number m being smaller than the first bit number n, said extracting being based on calibration data comprising at least a quantum contribution value of said quantum tunneling fluctuations in said raw bit sample; and an external contribution value in said raw bit sample;

wherein said obtaining includes identifying crossings of the instantaneous level of the current across a given value as the instantaneous level of the current varies and determining a period of time elapsed between two successive crossings, including attributing a value to said period of time elapsed.

36. The method of claim 35 wherein said obtaining includes obtaining a source bit sample from said attributing, the source bit sample corresponding to said period of time elapsed, further comprising repeating said identifying and said determining to obtain a plurality of source bit samples, and concatenating the plurality of source bit samples into the raw bit sample.

* * * * *

UNITED STATES PATENT AND TRADEMARK OFFICE
CERTIFICATE OF CORRECTION

PATENT NO. : 10,430,160 B2
APPLICATION NO. : 16/150010
DATED : October 1, 2019
INVENTOR(S) : Bertrand Reulet et al.

It is certified that error appears in the above-identified patent and that said Letters Patent is hereby corrected as shown below:

In the Specification

At Column 6, Line number 55, delete "a(V)" and replace with --$\sigma^2(V)$--.
At Column 8, Line number 12, delete "VII" and replace with --V/I--.
At Column 8, Line number 21, delete "S$_J$" and replace with --S$_j$--.
At Column 9, Line number 2, equation 7, delete the portion of the equation reading "S$_j$" and replace with --S$_J$--.

At Column 11, Line number 61, delete "at$^2$" and replace with --  --.

Signed and Sealed this
Thirty-first Day of December, 2019

Andrei Iancu
*Director of the United States Patent and Trademark Office*